United States Patent
Zhang et al.

(10) Patent No.: US 11,780,959 B1
(45) Date of Patent: Oct. 10, 2023

(54) PREPARATION METHOD OF POLYBUTYLENE ADIPATE TEREPHTHALATE-POLYLACTIC ACID BLEND FILMS MODIFIED BY EPOXIDIZED CARDANOL-BASED CHAIN EXTENDER

(71) Applicant: Beijing Technology and Business University, Beijing (CN)

(72) Inventors: Caili Zhang, Beijing (CN); Yunxuan Weng, Beijing (CN); Yang Yang, Beijing (CN); Xiaoqian Diao, Beijing (CN); Xinyu Song, Beijing (CN)

(73) Assignee: BEIJING TECHNOLOGY AND BUSINESS UNIVERSITY, Beijing (CN)

( * ) Notice: Subject to any disclaimer, the term of this patent is extended or adjusted under 35 U.S.C. 154(b) by 0 days.

(21) Appl. No.: 18/320,312

(22) Filed: May 19, 2023

(30) Foreign Application Priority Data

Aug. 2, 2022 (CN) .......................... 202210923288.4

(51) Int. Cl.
| | |
|---|---|
| *C08G 63/183* | (2006.01) |
| *C08G 63/08* | (2006.01) |
| *C08G 63/46* | (2006.01) |
| *B29C 48/08* | (2019.01) |
| *B29C 48/00* | (2019.01) |
| *B29K 67/00* | (2006.01) |
| *B29L 31/00* | (2006.01) |

(52) U.S. Cl.
CPC ........ *C08G 63/183* (2013.01); *B29C 48/0017* (2019.02); *B29C 48/022* (2019.02); *B29C 48/08* (2019.02); *C08G 63/08* (2013.01); *C08G 63/46* (2013.01); *B29C 2948/92704* (2019.02); *B29K 2067/006* (2013.01); *B29K 2067/046* (2013.01); *B29K 2995/006* (2013.01); *B29L 2031/712* (2013.01); *C08G 2230/00* (2013.01)

(58) Field of Classification Search
USPC ........................................................ 428/480
See application file for complete search history.

(56) References Cited

FOREIGN PATENT DOCUMENTS

CN 114479398 A 5/2022

*Primary Examiner* — Terressa Boykin
(74) *Attorney, Agent, or Firm* — Kaplan Breyer Schwarz, LLP; Stuart H. Mayer

(57) ABSTRACT

Disclosed is a preparation method of polybutylene adipate terephthalate (PBAT)-polylactic acid (PLA) blend films modified by an epoxidized cardanol-based chain extender, belonging to the technical field of biodegradable film processing. The modified PBAT-PLA blend films include raw materials in parts by weight of 80-85 parts of PBAT, 15-20 parts of PLA, and 0.5-1.5 parts of the epoxidized chain extender, where the epoxidized chain extender is an epoxidized cardanol-based chain extender. The preparation method includes the following steps: mixing PBAT, PLA and the epoxidized chain extender, and performing melting, extruding and granulating to obtain a blends masterbatch, then extrusion blowing the blends masterbatch into a film to obtain the PBAT-PLA blend film modified by the epoxidized cardanol-based chain extender.

7 Claims, 17 Drawing Sheets

PREPARATION METHOD OF POLYBUTYLENE ADIPATE TEREPHTHALATE-POLYLACTIC ACID BLEND FILMS MODIFIED BY EPOXIDIZED CARDANOL-BASED CHAIN EXTENDER

CROSS-REFERENCE TO RELATED APPLICATIONS

This application claims priority to Chinese Patent Application No. 202210923288.4, filed on Aug. 2, 2022, the contents of which are hereby incorporated by reference.

TECHNICAL FIELD

The present application relates to a preparation method of polybutylene adipate terephthalate (PBAT)-polylactic acid (PLA) blend films modified by an epoxidized cardanol-based chain extender, belonging to the technical field of biodegradable film processing.

BACKGROUND

More than 50% of plastic products are agricultural mulching films and packaging films, so plastic films are the main source of plastic pollution.

At present, the most widely used biodegradable polymers are polylactic acid (PLA) and polybutylene adipate terephthalate (PBAT), accounting for 13.5% and 18.8% of the biodegradable plastics used, respectively. Among them, PBAT is a flexible biodegradable copolyester with excellent film-forming properties, yet it possesses weak mechanical strength and fails to meet the requirements for film bags when used alone. In contrast, PLA, with high strength and good heat resistance, has been employed to prepare biodegradable PBAT-PLA composite modified films for different applications by combining the good heat resistance and mechanical strength of PLA with the good flexibility of PBAT and adjusting the ratio of PLA and PBAT in terms of different applications. However, the chemical structures of PBAT and PLA differ greatly, resulting in poor compatibility, and a compatibilizer is therefore required to prepare a PBAT-PLA blend film with good dispersibility and interfacial bonding.

Currently, the most widely used chain extender in the preparation of biodegradable materials is epoxidized styrene-glycidyl methacrylate (ADR 4468), a copolymer of styrene, acrylate and acrylic acid glycidyl ester, containing five epoxy functional groups in its structure. However, the monomers in ADR 4468 are all derived from petroleum monomers, which are non-renewable, and contain a styrene structure that is hardly biodegradable. Consequently, the biodegradability of the modified PBAT-PLA blend film is affected by the addition of high levels of ADR 4468 epoxidized chain extender. As such, further research on modified PBAT-PLA blend film is required.

SUMMARY

In order to solve the above technical problems, the present application provides polybutylene adipate terephthalate (PBAT)-polylactic acid (PLA) blend films modified by an epoxidized cardanol-based chain extender.

To achieve the above objectives, the present application provides the following technical schemes:

the present application provides PBAT-PLA blend films modified by an epoxidized cardanol-based chain extender, including raw materials in parts by weight as follows: 80-85 parts of PBAT, 15-20 parts of PLA, and 0.5-1.5 parts of the epoxidized chain extender, where the epoxidized chain extender is an epoxidized cardanol-based chain extender, and a total amount of the PBAT and PLA is 100 parts.

Optionally, in parts by weight, the raw materials include 85 parts of PBAT, 15 parts of PLA, and 1 part of the epoxidized chain extender, where the epoxidized chain extender is epoxidized cardanol glycidyl ether (ECGE) or epoxidized-cardanol oleate (ECD-OA).

Optionally, the ECGE is prepared by epoxidation of cardanol glycidyl ether (CGE) in $H_2O_2$ solution at 65 degrees Celsius (° C.) for 3 hours (h).

Optionally, the ECGE is prepared by a preparation method as follows: mixing the cardanol glycidyl ether (Cardolite NC513) with $H_2O_2$ solution with a mass concentration of 30%, acetic acid and concentrated sulfuric acid according to a molar ratio of 1:20:3:0.01, and reacting at 65° C. for 3 h to obtain the ECGE.

Optionally, the epoxidized-cardanol oleate is a cardanol oleate obtained by esterification of cardanol with oleic acid under epoxidation with $H_2O_2$ solution at 65° C. for 3 h.

Optionally, the epoxidized-cardanol oleate is prepared by a preparation method specifically as follows: mixing cardanol, oleic acid, 1-(3-dimethylaminopropyl)-3-ethylcarbodiimide hydrochloride and 4-dimethylaminopyridine according to a molar ratio of 2:2:3:1, and reacting for 5 h at room temperature to obtain cardanol oleate; mixing the cardanol oleate with $H_2O_2$ solution of a mass concentration of 30%, acetic acid and concentrated sulfuric acid in a molar ratio of 1:20:3:0.01 and reacting at 65° C. for 3 h to obtain the epoxidized-cardanol oleate.

The present application also provides a preparation method of the PBAT-PLA blend films modified by the epoxidized cardanol-based chain extender, including the following steps:

weighing each raw material according to the parts by weight, mixing PBAT, PLA and the epoxidized chain extender, and performing melting, extruding and granulating to obtain a blends masterbatch, then extrusion blowing the blends masterbatch into a film to obtain the PBAT-PLA blend film modified by the epoxidized cardanol-based chain extender.

Optionally, the melting, extruding and granulating are carried out under a temperature of 160-170° C.

Optionally, a temperature of extrusion blowing into the film is 160-165° C. and a take-up speed of 3 meters per minute (m/min).

The present application also provides an application of the PBAT-PLA blend films modified by the epoxidized cardanol-based chain extender in agricultural mulching films and packaging films.

Compatibilization is an effective approach to improve the performance of incompatible and partially compatible blends as well as regulating the interfacial adhesion between the blended components. For thermodynamic immiscible polymer blends, the compatibility can be enhanced by in situ reactive compatibilization, which transforms the rough form of the incompatible blends into a fine form, therefore improving the properties of the polymer blends.

The biodegradable polymer PBAT-PLA in the present application contains terminal carboxyl and terminal hydroxyl groups, two reactive groups that react readily with acid anhydrides, epoxides, oxazolines and isocyanates. In the melting and blending process, the reactive functional groups of the epoxidized cardanol-based chain extender are capable of reacting with the hydroxyl and carboxyl groups of the blended components to form in situ grafting and/or block copolymers, thus achieving compatibilization.

The present application discloses the following technical effects:

the epoxidized cardanol-based chain extenders used in the present application may all be synthesized by using the biomass-derived monomer cardanol as the base unit, thus enabling the chain extender modification of PBAT-PLA blend films; by changing the molecular structure and the position of the epoxy functional groups of the epoxidized cardanol-based chain extenders, the optimal structure and the optimal ratio of epoxidized cardanol-based chain extenders are determined and used to improve the interfacial bonding of the PBAT-PLA blend film, and the modified PBAT-PLA blend films prepared by the present application have excellent mechanical properties and biodegradability.

BRIEF DESCRIPTION OF THE DRAWINGS

For a clearer illustration of the technical schemes in the embodiments of the present application or in the prior art, a brief description of the accompanying drawings to be used in the embodiments is given below. It is obvious that the accompanying drawings in the following description are only some embodiments of the present application and that other drawings are available to a person of ordinary skill in the art without creative labor.

DETAILED DESCRIPTION OF THE EMBODIMENTS

Figure 1:
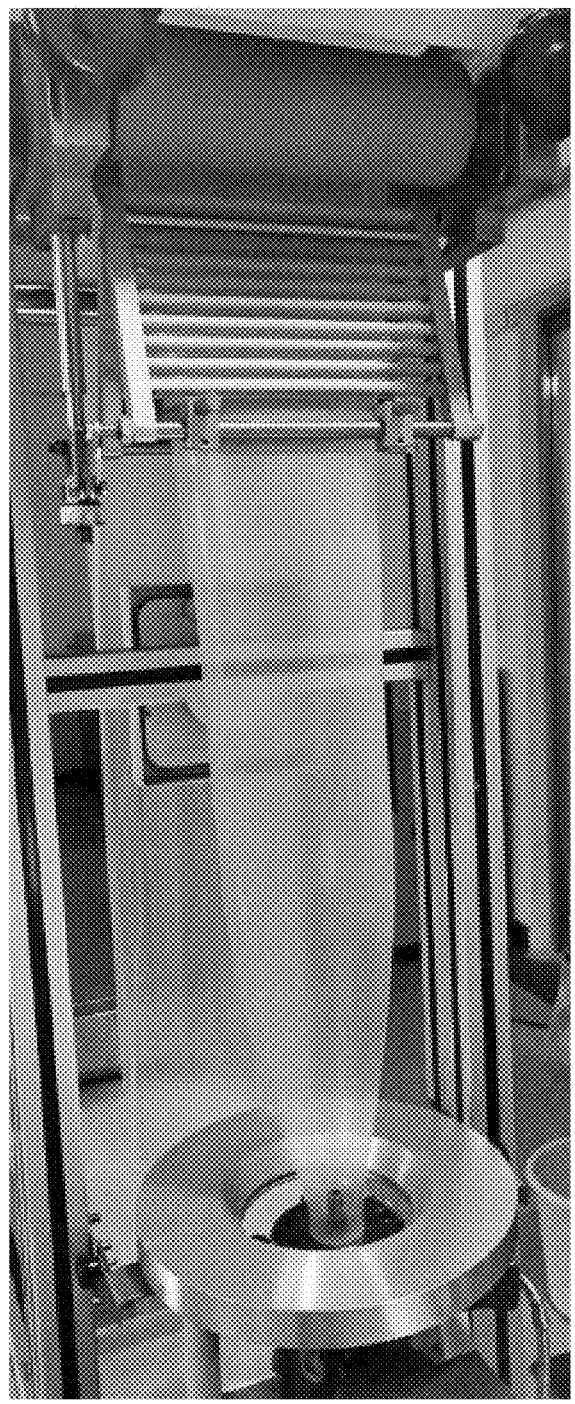
FIG. 1 shows a process of extrusion blowing in the Embodiment 2 of the present application.
Figure 2A:
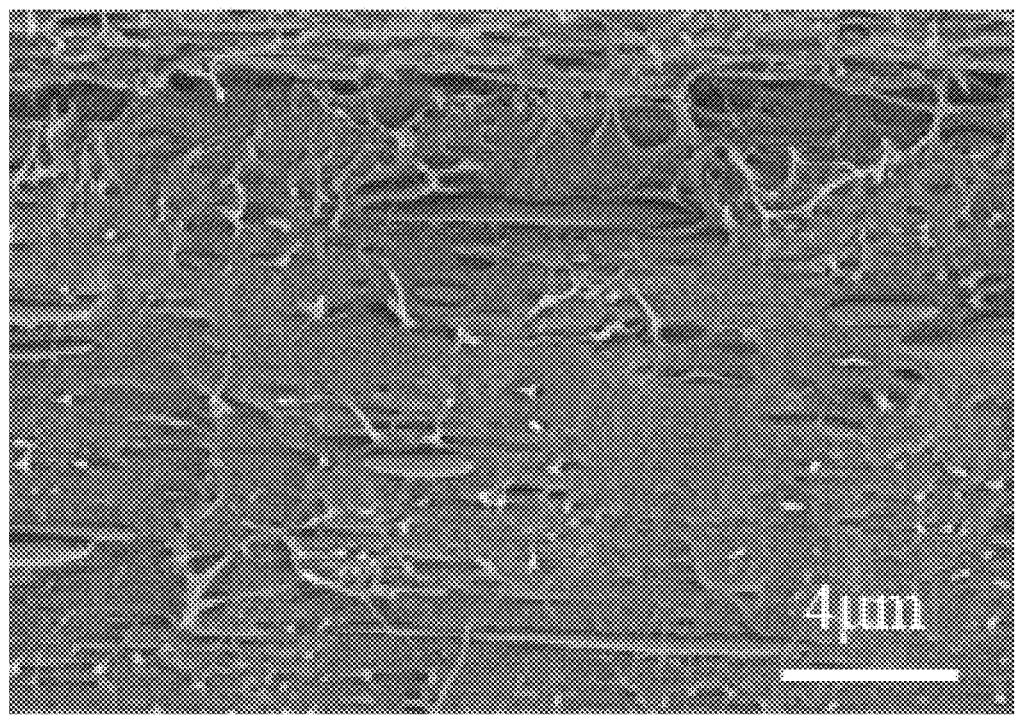
FIG. 2A shows a scanning electron microscope (SEM) image of longitudinal section of a blend film prepared in Comparative embodiment 1.
Figure 2B:
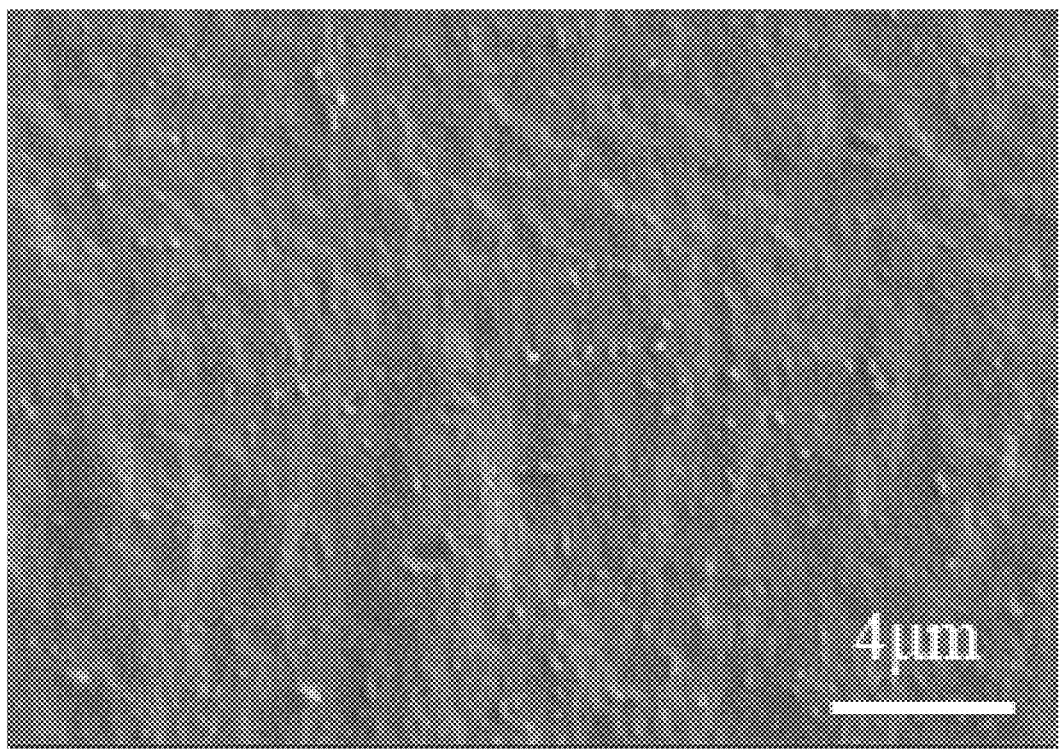
FIG. 2B shows an SEM image of longitudinal section of a blend film prepared in Embodiment 1.
Figure 2C:
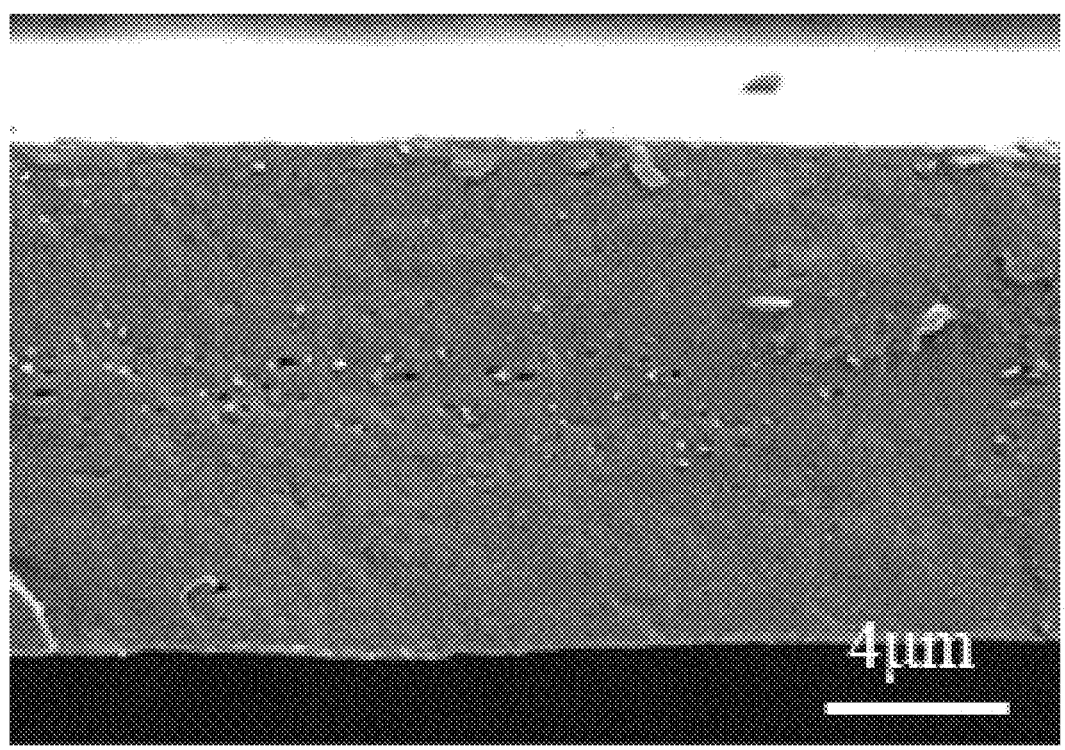
FIG. 2C shows an SEM image of longitudinal section of a blend film prepared in Embodiment 2.
Figure 2D:
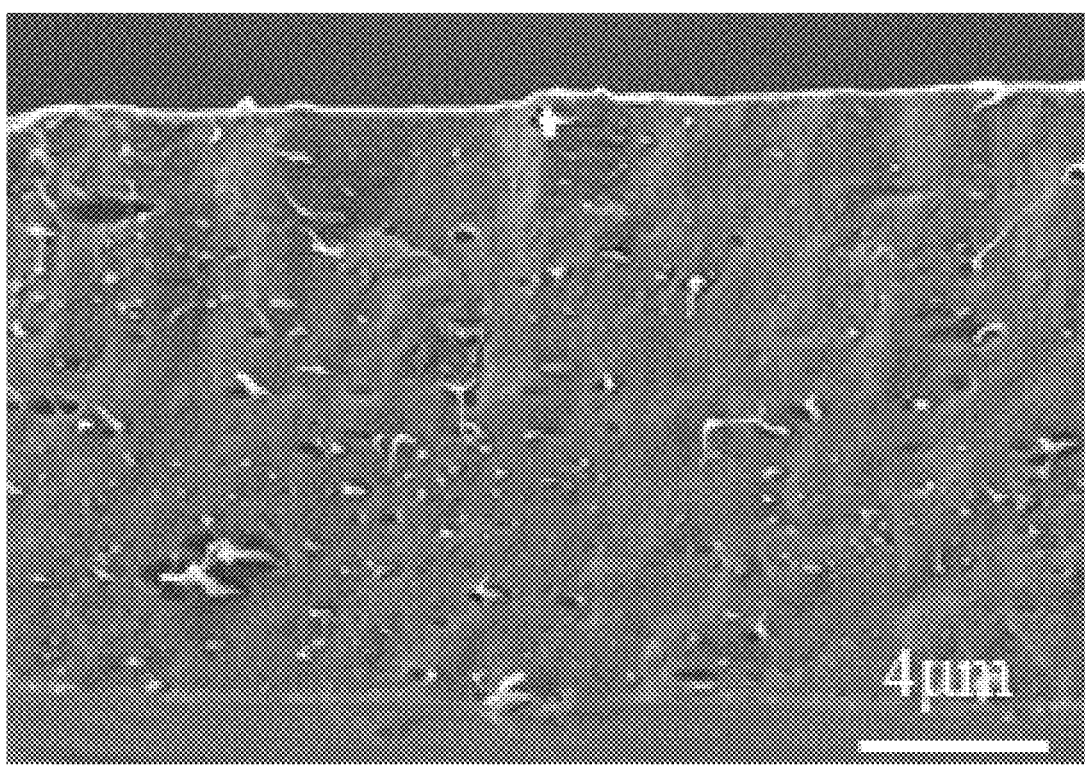
FIG. 2D shows an SEM image of longitudinal section of a blend film prepared in Embodiment 3.
Figure 2E:
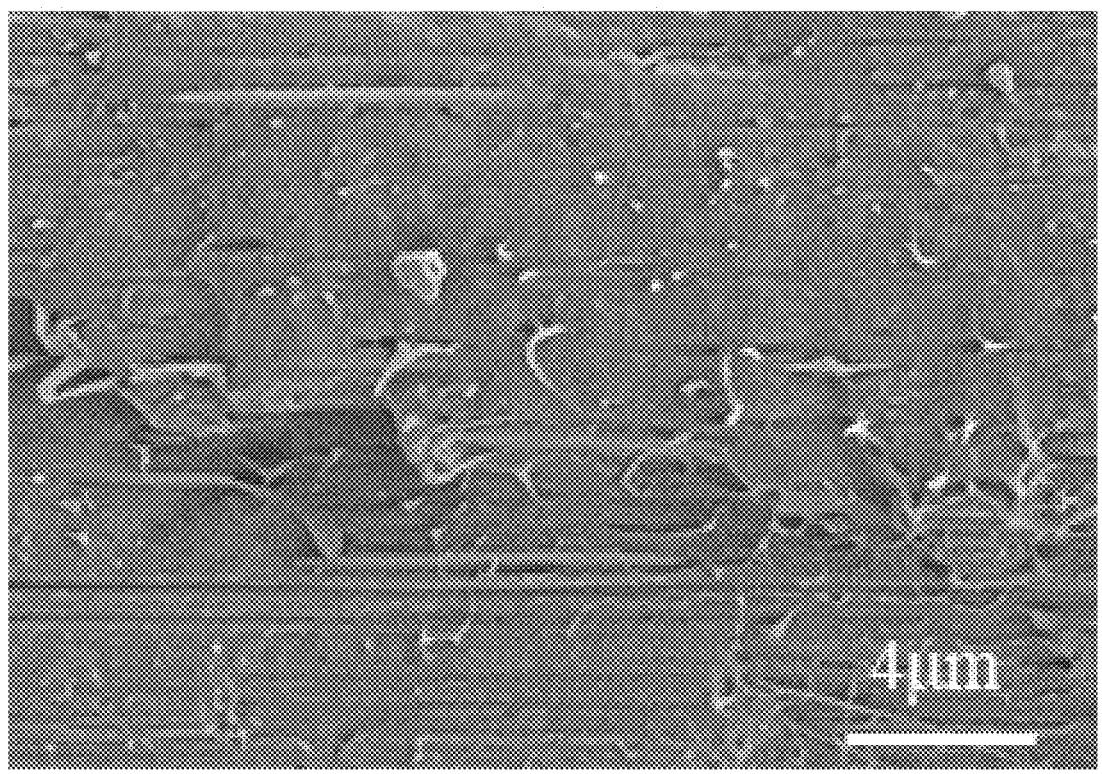
FIG. 2E shows an SEM image of longitudinal section of a blend film prepared in Comparative embodiment 3.
Figure 2F:
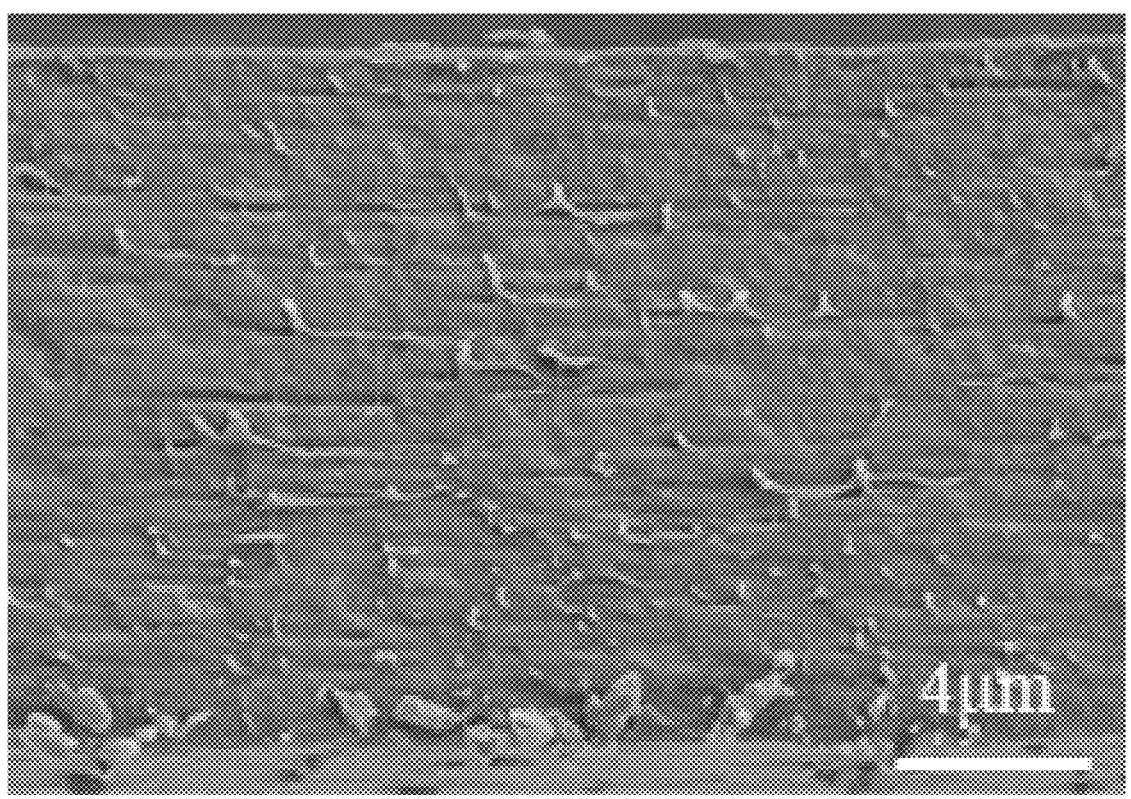
FIG. 2F shows an SEM image of longitudinal section of a blend film prepared in Comparative embodiment 5.
Figure 3A:
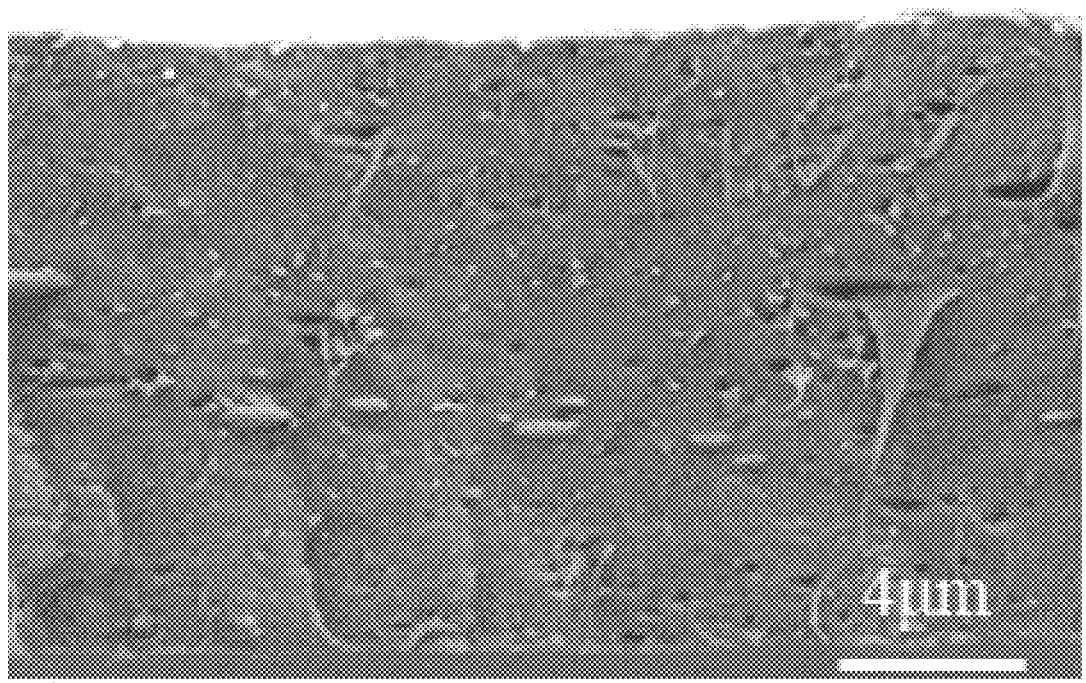
FIG. 3A shows an SEM image of transversal section of the blend film prepared in Comparative embodiment 1.
Figure 3B:
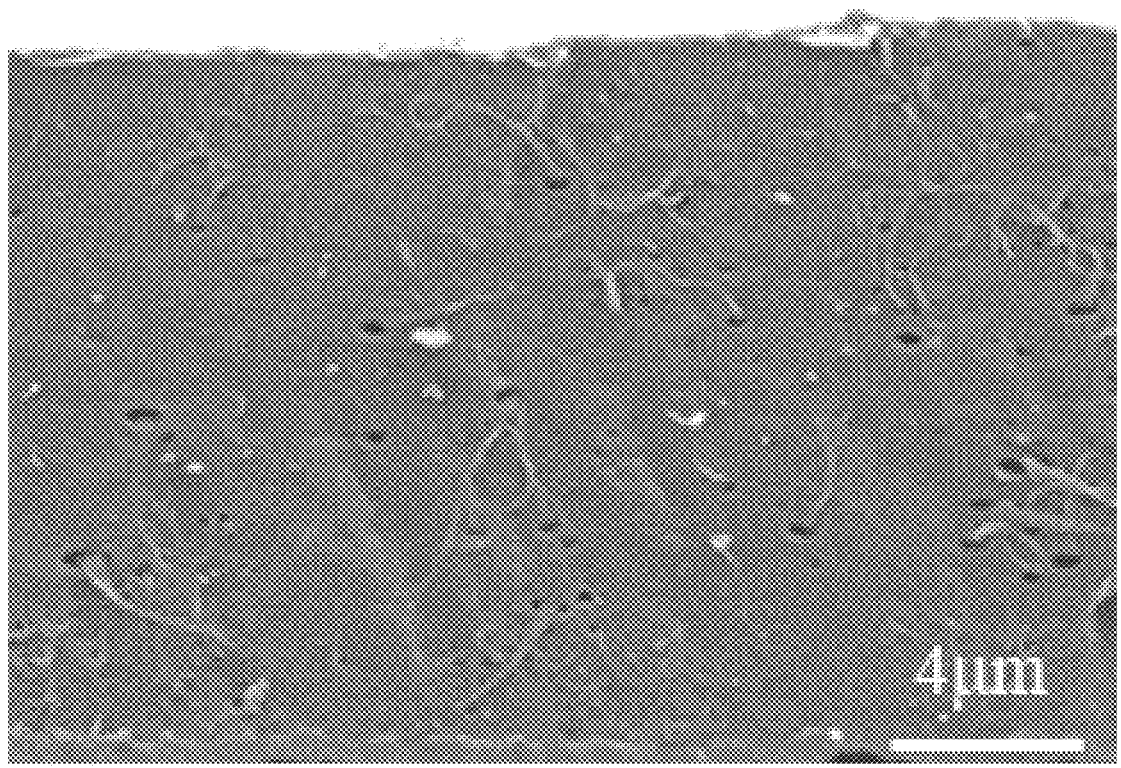
FIG. 3B shows an SEM image of transversal section of the blend film prepared in Embodiment 1.
Figure 3C:
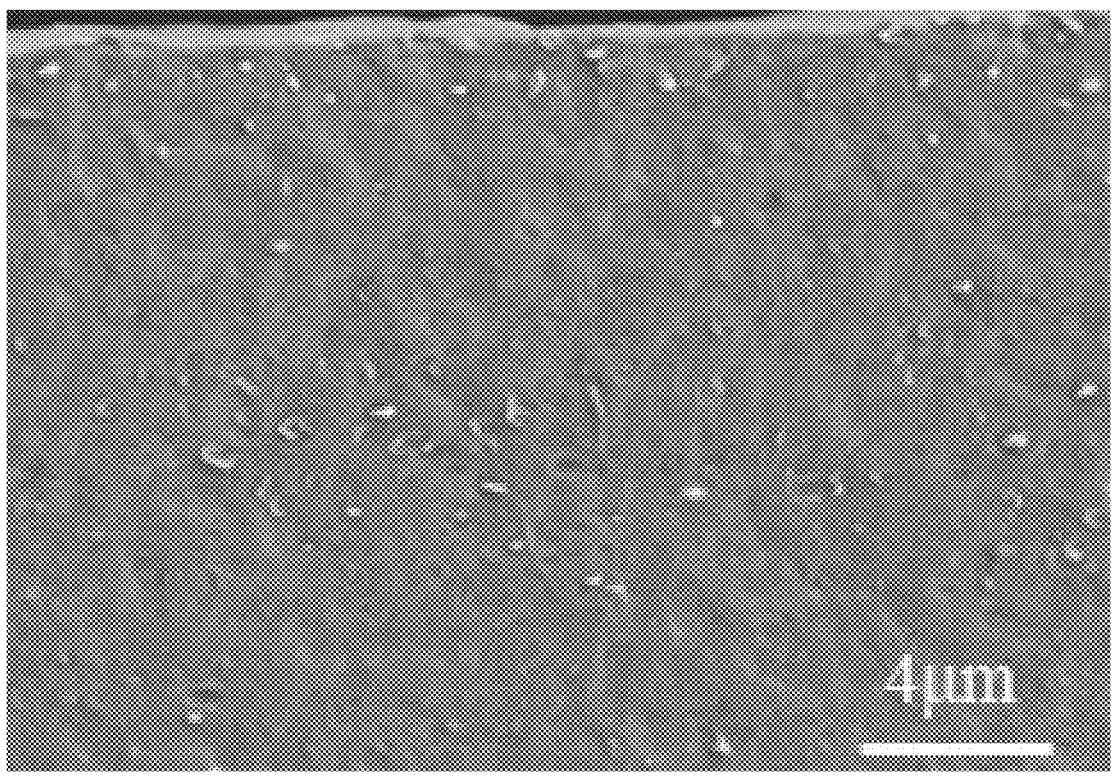
FIG. 3C shows an SEM image of transversal section of the blend film prepared in Embodiment 2.
Figure 3D:
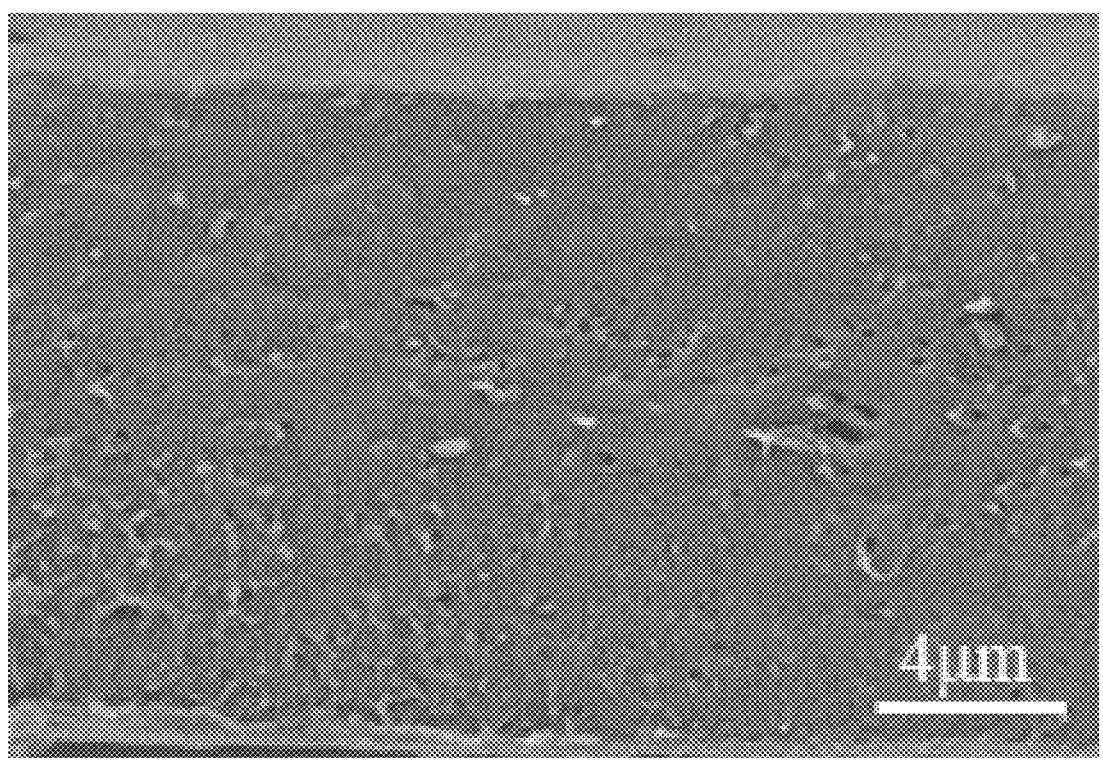
FIG. 3D shows an SEM image of transversal section of the blend film prepared in Embodiment 3.
Figure 3E:
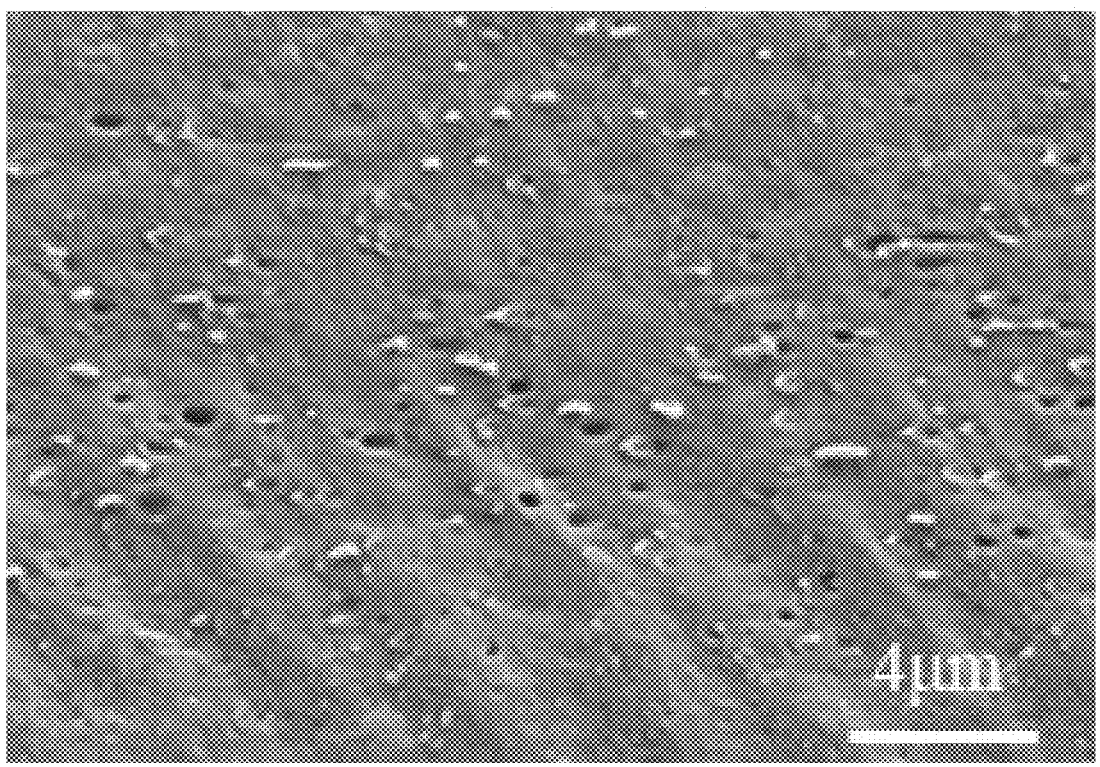
FIG. 3E shows an SEM image of transversal section of the blend film prepared in Comparative embodiment 3.
Figure 3F:
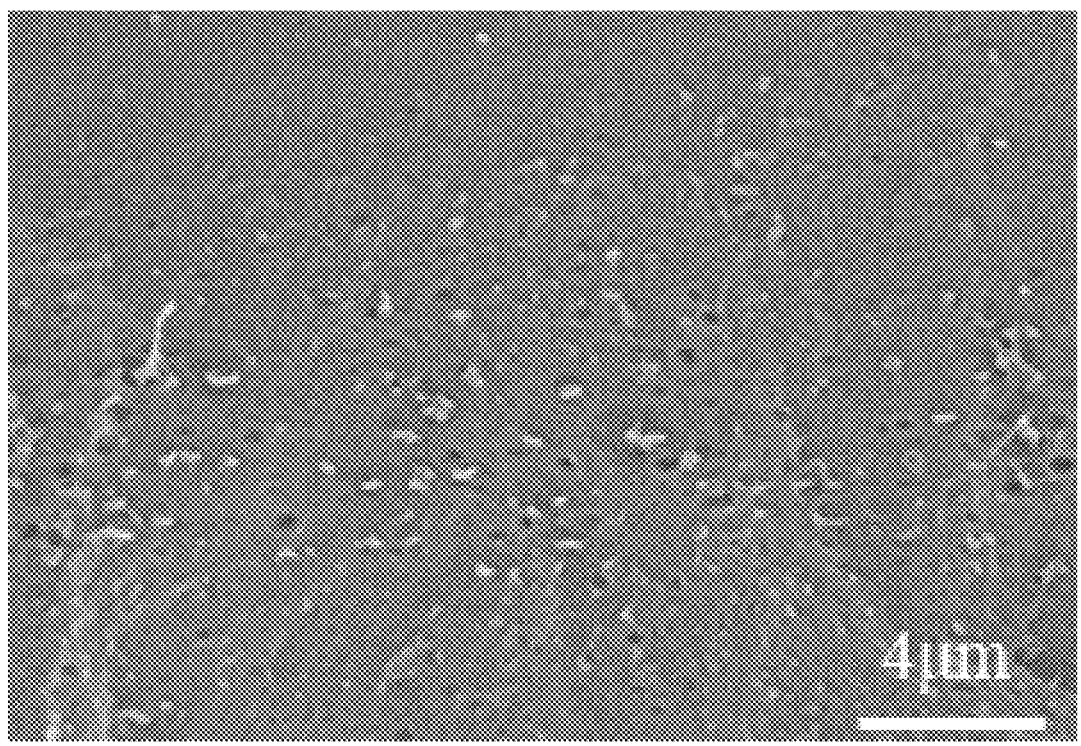
FIG. 3F shows an SEM image of transversal section of the blend film prepared in Comparative embodiment 5.

Various exemplary embodiments of the present application are now described in detail and this detailed description should not be considered a limitation of the present application, but should be understood as a more detailed description of certain aspects, features and embodiments of the present application.

It should be understood that the terminology described in the present application is only for describing specific embodiments and is not used to limit the present application. In addition, for the numerical range in the present application, it should be understood that each intermediate value between the upper limit and the lower limit of the range is also specifically disclosed. The intermediate value within any stated value or stated range and every smaller range between any other stated value or intermediate value within the stated range are also included in the present application. The upper and lower limits of these smaller ranges can be independently included or excluded from the range.

Unless otherwise specified, all technical and scientific terms used herein have the same meaning as commonly understood by one of ordinary skill in the art to which this present application relates. Although the present application only describes the preferred methods and materials, any methods and materials similar or equivalent to those described herein can also be used in the practice or testing of the present application. All documents mentioned in this specification are incorporated by reference to disclose and describe the methods and/or materials related to the documents. In case of conflict with any incorporated document, the contents of this specification shall prevail.

It is obvious to those skilled in the art that many improvements and changes can be made to the specific embodiments of the present application without departing from the scope or spirit of the present application. Other embodiments will be apparent to the skilled person from the description of the present application. The description and example of that present application are exemplary only.

The terms "including", "comprising", "having" and "containing" used in this specification are all open terms, which means including but not limited to.

The present application provides polybutylene adipate terephthalate (PBAT)-polylactic acid (PLA) blend films modified by an epoxidized cardanol-based chain extender, including raw materials in parts by weight as follows: 80-85 parts of PBAT, 15-20 parts of PLA, and 0.5-1.5 parts of the epoxidized chain extender, where the epoxidized chain extender is an epoxidized cardanol-based chain extender, and a total amount of the PBAT and PLA is 100 parts.

Optionally, in parts by weight, the raw materials include: 85 parts of PBAT, 15 parts of PLA, and 1 part of the epoxidized chain extender, where the epoxidized chain extender is epoxidized cardanol glycidyl ether (ECGE) or epoxidized-cardanol oleate (ECD-OA).

Optionally, the ECGE is prepared by epoxidation of cardanol glycidyl ether (CGE) in $H_2O_2$ solution at 65 degrees Celsius (° C.) for 3 hours (h).

Optionally, the epoxidized-cardanol oleate is a cardanol oleate obtained by esterification of cardanol with oleic acid under epoxidation with $H_2O_2$ solution at 65° C. for 3 h.

The present application also provides a preparation method of the PBAT-PLA blend films modified by the epoxidized cardanol-based chain extender, including the following steps:

weighing each raw material according to the parts by weight, mixing PBAT, PLA and the epoxidized chain extender, and performing melting, extruding and granulating to obtain a blends masterbatch, then extrusion blowing the blends masterbatch into a film to obtain the PBAT-PLA blend film modified by the epoxidized cardanol-based chain extender.

Optionally, the melting, extruding and granulating are carried out under temperature of 160-170° C.

Optionally, a temperature of extrusion blowing into the film is 160-165° C. and a take-up speed of 3 meters per minute (m/min).

The present application also provides an application of the PBAT-PLA blend films modified by the epoxidized cardanol-based chain extender in agricultural mulching films and packaging film.

The ECGE used in the embodiments of the present application is prepared by a method as follows: mixing the cardanol glycidyl ether with $H_2O_2$ solution with a mass concentration of 30%, acetic acid and concentrated sulfuric acid with a concentration of 98% by mass according to a molar ratio of 1:20:3:0.01, and reacting at 65° C. for 3 h to obtain the ECGE, with a specific reaction process is as follows:

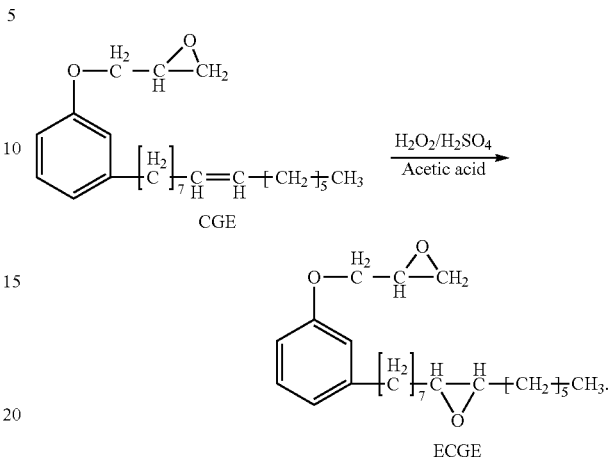

The epoxidized-cardanol oleate used in the embodiments of the present application is prepared by a method specifically as follows: mixing cardanol, oleic acid, 1-(3-dimethylaminopropyl)-3-ethylcarbodiimide hydrochloride and 4-dimethylaminopyridine according to a molar ratio of 2:2:3:1, and reacting for 5 h at room temperature to obtain cardanol oleate; mixing the cardanol oleate with $H_2O_2$ solution with a mass concentration of 30%, acetic acid and concentrated sulfuric acid with a concentration of 98% by mass in a molar ratio of 1:20:3:0.01 and reacting at 65° C. for 3 h to obtain the epoxidized-cardanol oleate, where a specific reaction process is as follows:

The epoxidized cardanol oligomer (Cardolite NC514) used in the embodiments of the present application comes from Cardolite Corporation, with a specific structural formula illustrated as follows:

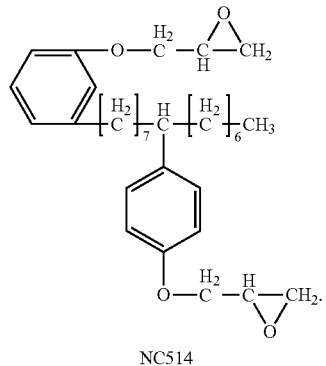

NC514

The Joncryl ADR 4468 is from BASF Corporation, with a specific structural formula as follows:

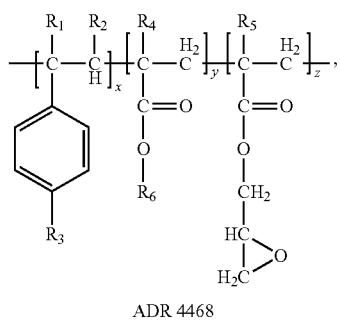

ADR 4468 where $R_1$-$R_5$ may be H or $CH_3$.

The first step in all embodiments and comparative embodiments of the present application includes melting, extruding, cooling and granulating in a twin-screw to obtain a mixed blends masterbatch for the second step of extrusion blowing.

The PLA used in the present application comes from NaturalWorks, with a mark number of 4032D, and a structural formula as follows:

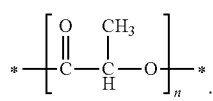

The PBAT used in the present application comes from Shanxi Jinhui Zhaolong FP-0325, with a mark number of FP-0325 and a structural formula as follows:

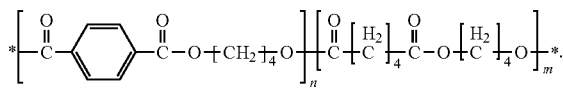

"Parts" used in the embodiments and comparative embodiments of the present application are all parts by weight unless otherwise specified.

The biodegradable polymer PBAT-PLA in the present application contains terminal carboxyl and terminal hydroxyl groups, two reactive groups that react readily with acid anhydrides, epoxides, oxazolines and isocyanates. In the melting and blending process, the reactive functional groups of the epoxidized cardanol-based chain extender are capable of reacting with the hydroxyl and carboxyl groups of the blended components to form in situ grafting and/or block copolymers, thus achieving compatibilization, where a structure is as follows:

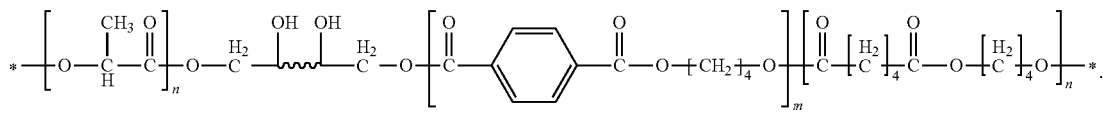

The term "equal amount" in the embodiment of the present application refers to equal mass.

The technical schemes of the present application are further explained by embodiments.

Embodiment 1

PBAT of 85 parts, PLA of 15 parts and ECGE of 0.5 part are weighed according to the parts by weight, and mixed to subject to melting, extruding and granulating using a twin screw to obtain a blends masterbatch, where an extruder is set with five sections of temperatures in an order of 160° C., 165° C., 165° C., 168° C. and 170° C. from the first zone to the die zone; then the resulting blends masterbatch is extrusion blown using a blow moulding machine at a temperature of 160° C., 160° C., 165° C. and 165° C. from the first zone to the die zone, with a take-up speed of 3 m/min, to obtain a PBAT-PLA blend film (85PBAT-15PLA-0.5ECGE) modified by the epoxidized cardanol-based chain extender.

Embodiment 2

Same as Embodiment 1, except that 1.0 part of ECGE is added in the present embodiment to prepare a PBAT-PLA blend film (85PBAT-15PLA-1.0ECGE) modified by the epoxidized cardanol-based chain extender, with a process of extrusion blowing as shown in FIG. 1.

Embodiment 3

Same as Embodiment 1, except that 1.5 parts of ECGE is added in the present embodiment to prepare a PBAT-PLA blend film (85PBAT-15PLA-1.5ECGE) modified by the epoxidized cardanol-based chain extender.

Embodiment 4

Same as Embodiment 1, except that 0.5 part of ECGE is replaced by 1.0 part of epoxidized-cardanol oleate in the present embodiment to prepare a PBAT-PLA blend film (85PBAT-15PLA-1.0ECD-OA) modified by the epoxidized cardanol-based chain extender.

Embodiment 5

Same as Embodiment 2, except that that 80 parts of PBAT and 20 parts of PLA are weighed in parts by weight to prepare a PBAT-PLA blend film (80PBAT-20PLA-1.0ECGE) modified by the epoxidized cardanol-based chain extender.

Comparative Embodiment 1

Same as Embodiment 1, except that no chain extender is added in the present comparative embodiment and a blank reference sample of a PBAT-PLA blend film (85PBAT-15PLA) is obtained.

Comparative Embodiment 2

Same as Embodiment 1, except that the 0.5 part of ECGE is replaced with 0.5 part of ADR 4468 in equal amounts in the present comparative embodiment to obtain a modified PBAT-PLA blend film (85PBAT-15PLA-0.5ADR).

Comparative Embodiment 3

Same as Embodiment 1, except that the 0.5 part of ECGE is replaced with 1.0 part of ADR 4468 in the present comparative embodiment to obtain a modified PBAT-PLA blend film (85PBAT-15PLA-1.0ADR).

Comparative Embodiment 4

Same as Embodiment 1, except that the 0.5 part of ECGE is replaced with 0.5 part of NC514 in the present comparative embodiment to obtain a modified PBAT-PLA blend film (85PBAT-15PLA-0.5NC514).

Comparative Embodiment 5

Same as Embodiment 1, except that the 0.5 part of ECGE is replaced with 1.0 part of NC514 in the present comparative embodiment to obtain a modified PBAT-PLA blend film (85PBAT-15PLA-1.0NC514).

See Table 1 for a comparison of the amounts of each ingredient used in the preparation of Embodiments 1-5 and Comparative embodiments 1-5.

TABLE 1

Comparison of the amounts of each raw material used in of embodiments and comparative embodiments

| | PBAT (wt %) | PLA (wt %) | ECGE (phr) | ECD-OA (phr) | ADR 4468 (phr) | NC514 (phr) |
|---|---|---|---|---|---|---|
| Embodiment 1 | 85 | 15 | 0.5 | | | |
| Embodiment 2 | 85 | 15 | 1.0 | | | |
| Embodiment 3 | 85 | 15 | 1.5 | | | |
| Embodiment 4 | 85 | 15 | | 1.0 | | |
| Embodiment 5 | 80 | 20 | 1.0 | | | |
| Comparative embodiment 1 | 85 | 15 | | | | |
| Comparative embodiment 2 | 85 | 15 | | | 0.5 | |
| Comparative embodiment 3 | 85 | 15 | | | 1.0 | |
| Comparative embodiment 4 | 85 | 15 | | | | 0.5 |
| Comparative embodiment 5 | 85 | 15 | | | | 1.0 |

Performance Test

I. Molecular Weight Test

The change of molecular weight before and after the chain extension reaction is the parameter that most directly reflects the chain extension efficiency. The number average molecular weight Mn, weight average molecular weight Mw and distribution index Mw/Mn of the modified PBAT-PLA blend films prepared from Embodiments 1-5 and Comparative embodiments 1-5 are tested by gel permeation chromatography with the mobile phase of tetrahydrofuran, and the measurement results are shown in Table 2.

TABLE 2

Molecular weights of embodiments and comparative embodiments

| Samples | | Mn | Mw | Mw/Mn |
|---|---|---|---|---|
| Embodiment 1 | 85PBAT-15PLA-0.5ECGE | 36,861 | 100,572 | 2.73 |
| Embodiment 2 | 85PBAT-15PLA-1.0ECGE | 38,307 | 102,320 | 2.67 |
| Embodiment 3 | 85PBAT-15PLA-1.5ECGE | 38,141 | 101,277 | 2.66 |
| Embodiment 4 | 85PBAT-15PLA-1.0ECD-OA | 38,157 | 100,649 | 2.64 |
| Embodiment 5 | 80PBAT-20PLA-1.0ECGE | 38,767 | 101,982 | 2.63 |
| Comparative embodiment 1 | 85PBAT-15PLA | 33,656 | 98,262 | 2.92 |
| Comparative embodiment 2 | 85PBAT-15PLA-0.5ADR | 35,040 | 93,943 | 2.68 |
| Comparative embodiment 3 | 85PBAT-15PLA-1.0ADR | 36,225 | 98,342 | 2.71 |
| Comparative embodiment 4 | 85PBAT-15PLA-0.5NC514 | 35,444 | 99,483 | 2.81 |
| Comparative embodiment 5 | 85PBAT-15PLA-1.0NC514 | 36,519 | 96,712 | 2.65 |

As can be seen from the data in Table 2, after three epoxidized cardanol-based chain extenders ECGE, epoxidized-cardanol oleate, NC514 and ADR 4468 are used to extend the chain of PBAT-PLA blend materials, the number average molecular weights of modified PBAT-PLA blend films with the same amount of chain extenders (1.0 part) prepared in Embodiments 1-5 and Comparative embodiments 1-5 are compared and found that Embodiment 2>Embodiment 4>Comparative embodiment 5>Comparative embodiment 3, i.e.: ECGE>ECD-OA>NC514>ADR 4468, suggesting that the three epoxidized cardanol-based chain extenders provide better performance of molecular chain extension and molecular weight increase.

II. Mechanical Properties Test

The compatibilization and modification performance of chain extenders is investigated by mechanical properties tests; for thermodynamic immiscible polymer blends, the compatibility can be enhanced by in situ reactive compatibilization, which transforms the rough form of the incompatible blends into a fine form, therefore improving the properties of the polymer blends.

The tensile properties of the modified PBAT-PLA blend films prepared from Embodiments 1-5 and Comparative embodiments 1-5 are tested according to GB/T 10004-2008 and the test results are shown in Table 3.

TABLE 3

Tensile test results of embodiments and comparative embodiments

| | Elongation at break (%) | | Tensile strength (MPa) | |
|---|---|---|---|---|
| | Longitudinal | Transverse | Longitudinal | Transverse |
| Embodiment 1 | 448.0 ± 24.3 | 424.8 ± 21.2 | 27.7 ± 1.9 | 16.7 ± 0.0 |
| Embodiment 2 | 518.7 ± 25.1 | 525.0 ± 23.8 | 29.6 ± 3.9 | 17.9 ± 0.8 |
| Embodiment 3 | 536.0 ± 22.8 | 535.4 ± 8.0 | 21.6 ± 1.4 | 14.3 ± 0.9 |
| Embodiment 4 | 490.6 ± 41.4 | 464.7 ± 17.1 | 33.8 ± 5.8 | 12.7 ± 0.7 |
| Embodiment 5 | 474.8 ± 20.8 | 448.4 ± 17.2 | 33.5 ± 4.1 | 24.5 ± 2.0 |
| Comparative embodiment 1 | 219.7 ± 28.8 | 185.5 ± 13.8 | 19.3 ± 2.7 | 17.6 ± 3.0 |
| Comparative embodiment 2 | 237.0 ± 19.5 | 216.3 ± 39.2 | 24.4 ± 3.6 | 18.1 ± 4.2 |
| Comparative embodiment 3 | 282.5 ± 19.6 | 255.6 ± 23.9 | 25.4 ± 3.9 | 24.7 ± 4.7 |
| Comparative embodiment 4 | 279.8 ± 56.0 | 251.0 ± 17.7 | 37.5 ± 8.8 | 16.6 ± 1.7 |
| Comparative embodiment 5 | 302.2 ± 7.4 | 266.2 ± 29.5 | 33.8 ± 5.3 | 16.3 ± 3.2 |

As can be seen from the data in Table 3, a comparison of the elongation at break of modified PBAT-PLA blend films prepared by adding the same amount (1.0 part) of chain extender to Embodiment 2, Embodiment 4, Comparative embodiment 3 and Comparative embodiment 5 reveals that Embodiment 2>Embodiment 4>Comparative embodiment 5>Comparative embodiment 3, i.e. ECGE>ECD-OA>NC514>ADR 4468, where the elongation at break of Embodiment 2 with the addition of 1.0 part ECGE is 2.4 times the elongation at break of the Comparative embodiment 1 and 1.84 times the elongation at break of the Comparative embodiment 3. The mechanical properties of both Embodiment 1 and Embodiment 2 show an increase as the addition of ECGE increases from 0.5 part to 1.5 parts, the elongation at break is basically the same, and the tensile strength shows a significant decrease, which is mainly due to the excessive amount of ECGE unreacted with the polymer serves as a plasticizing and lubricating agent in the polymer, resulting in a clear decrease in the tensile strength of the blend film; therefore, the optimum amount of epoxidized chain extender to be added is 1.0 part.

ECGE is added to effectively improve the interfacial adhesion of the two phases of PBAT-PLA and enhance the compatibility of the two phases, which is the main reason for the improvement of mechanical properties. The main reason for the poor chain extension performance of epoxidized-cardanol oleate compared to that of ECGE is that the aliphatic chain of epoxidized-cardanol oleate is longer and the epoxy functional group is wrapped by a flexible aliphatic chain, which makes it less likely for the epoxy group of epoxidized-cardanol oleate to engage with the polyester end group compared to ECGE where the epoxy group is attached to the end group, thus the chain extension performance of epoxidized-cardanol oleate is not as good as that of ECGE. Moreover, the chain extension performance of NC514, which also has two terminal epoxy groups, is not as good as that of epoxidized-cardanol oleate for the reason that NC514 contains two benzene rings in its molecular structure, which is more rigid and spatially blocked, and there is a certain resistance to the diffusion of the chain extension agent molecules into the PBAT-PLA phase interface, therefore the chain extension performance is not as good as that of ECGE and epoxidized-cardanol oleate, which contain one benzene ring.

The three epoxidized cardanol-based chain extenders, ECGE, epoxidized-cardanol oleate and NC514, are all more effective than ADR 4468 because the former three are molecularly smaller (less than 1000), whereas ADR 4468 has a molecular weight of 6,800. For the same mass added, the molarity of the first three is much higher than the latter, and therefore the number of epoxy functional groups is also much higher than the latter one, giving a higher chance of reaction; moreover, the diffusion of small molecules into the phase interface is more frequent, and therefore the chance of chain extension and compatibilization reactions at the phase interface is also higher. These factors are the main reasons why epoxidized cardanol-based chain extenders have a better chain extension and compatibilization effect than ADR.

III. Scanning Electron Microscope (SEM) Test

The modified PBAT-PLA blend films prepared in Embodiments 1, 2 and 3 and Comparative embodiments 1, 3 and 5 are subjected to cross-sectional SEM scanning and the results are compared; FIG. 2A-FIG. 2F are SEM images of longitudinal sections of the modified PBAT-PLA blend films prepared in Comparative embodiment 1, Embodiment 1, Embodiment 2, Embodiment 3, Comparative embodiment 3, and Comparative embodiment 5, respectively; FIG. 3A-FIG. 3F are SEM images of transversal sections of the modified PBAT-PLA blend films prepared in Comparative embodiment 1, Embodiment 1, Embodiment 2, Embodiment 3, Comparative embodiment 3, and Comparative embodiment 5, respectively. The phase interface of PLA in PBAT is reduced in the blend film with ECGE added compared to that of Comparative embodiment 1, with only a small amount of PLA-dispersed phase in the cross-section in Embodiment 2. Compared with Comparative Example 1, in the blend film with ECGE, the phase interface of PLA in PBAT is reduced, and there is only a small amount of PLA-dispersed phase in the cross section of Example 2.

IV. Soil Landfill Degradation Test

Figure 4A:
FIG. 4A shows the blend film of Embodiment 2 in terms of morphology after degradation of 0 days.
Figure 4B:
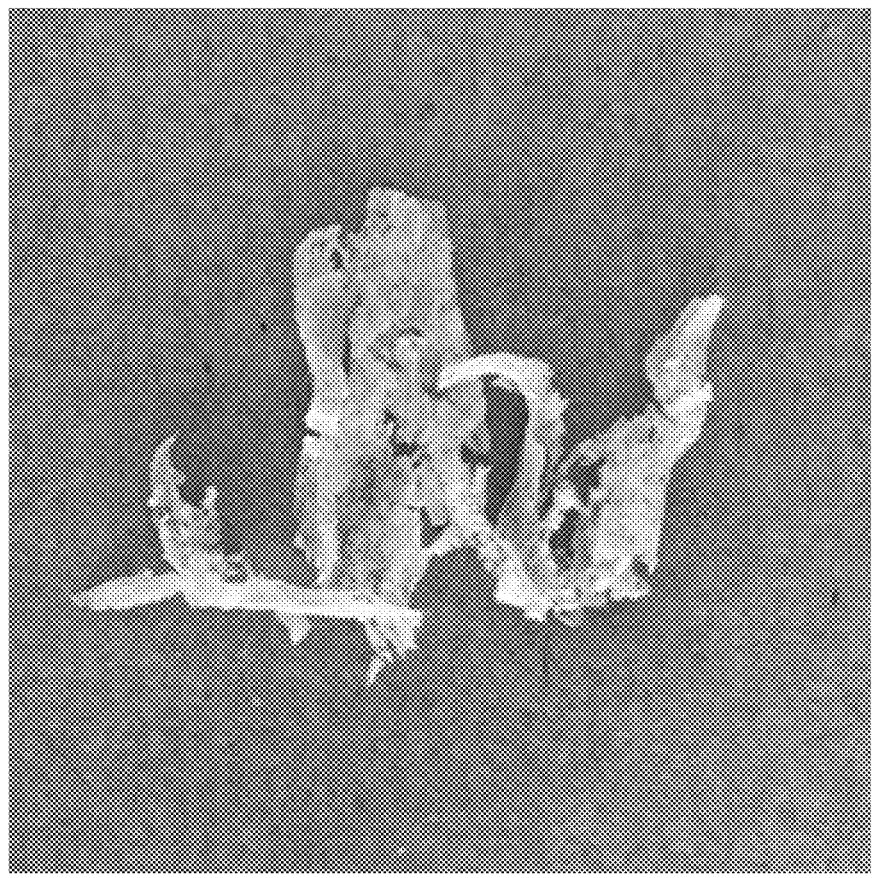
FIG. 4B shows the blend film of Embodiment 2 in terms of morphology after degradation of 30 days.
Figure 4C:
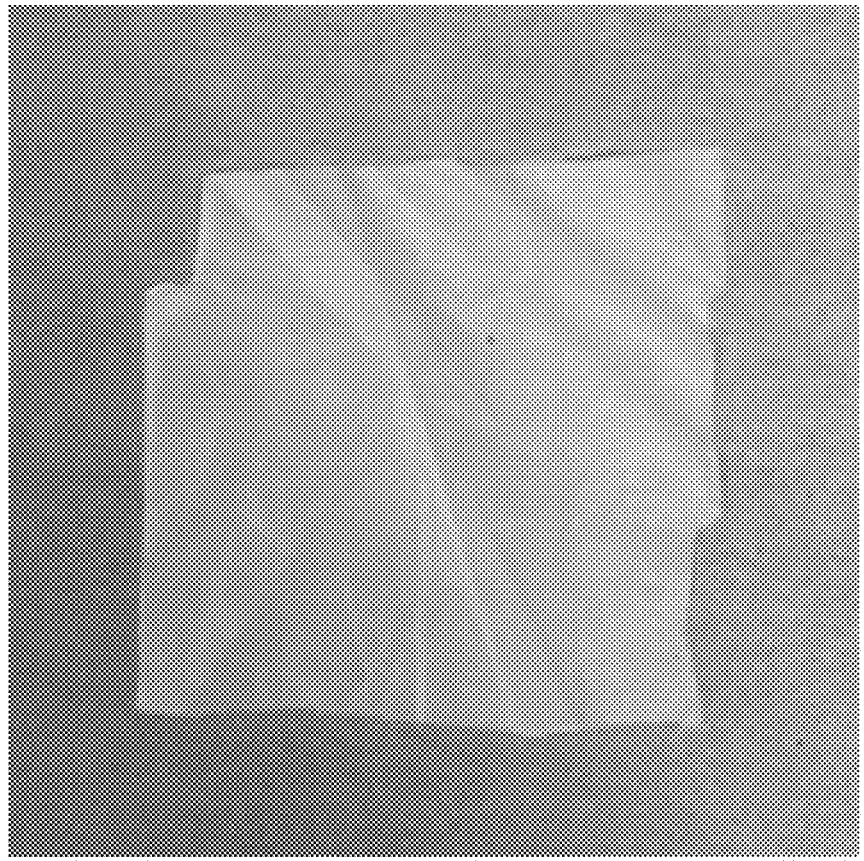
FIG. 4C shows the blend film of Comparative embodiment 3 in terms of morphology after degradation of 0 days.
Figure 4D:
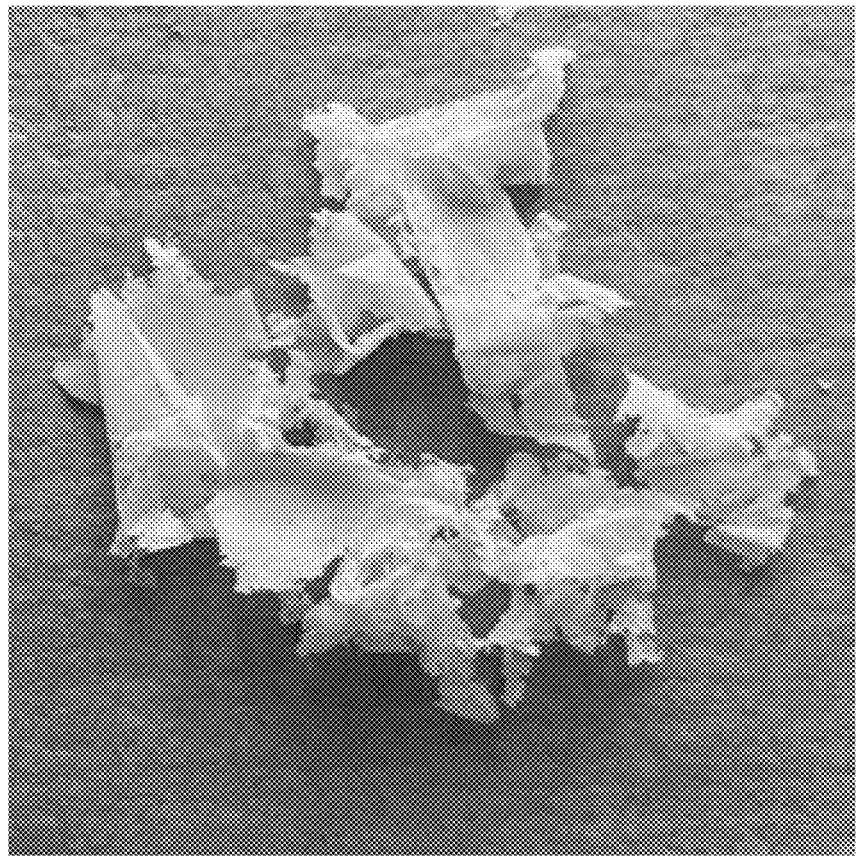
FIG. 4D shows the blend film of Comparative embodiment 3 in terms of morphology after degradation of 30 days.

The blend films prepared in Embodiment 2 and Comparative embodiment 3 are buried in the soil for 30 days to observe the degradation of blend film before and after 30 days, where FIG. 4A shows the morphology of the blend film prepared in Embodiment 2 after 0 day of degradation, and FIG. 4B shows that after 30 days of degradation; FIG. 4C shows the morphology of the blend film prepared in Comparative embodiment 3 after 0 day of degradation, and FIG. 4D shows that after 30b days of degradation. As can be seen from the FIG. 4A-FIG. 4D, the mass loss of the blend film with ECGE added in Embodiment 2 is 65% and the mass loss of the blend film with ADR added in Comparative embodiment 3 is 32%.

By incorporating oligomer chain extender of epoxidized cardanol glycidyl ether, the present application prepares PBAT-PLA films with excellent mechanical properties. As the raw materials for chain extenders are derived from biomass with non-toxic and green characteristics, the film can be used in agricultural mulch and packaging films, and also in the field of food packaging films.

The above-mentioned embodiments only describe the preferred mode of the present application, and do not limit the scope of the present application. Under the premise of not departing from the design spirit of the present application, various modifications and improvements made by ordinary technicians in the field to the technical scheme of the present application shall fall within the protection scope determined by the claims of the present application.

What is claimed is:

1. A polybutylene adipate terephthalate (PBAT)-polylactic acid (PLA) blend film modified by an epoxidized cardanol-based chain extender, comprising raw materials in parts by weight of 80-85 parts of PBAT, 15-20 parts of PLA, and 0.5-1.5 parts of epoxidized chain extender; wherein the epoxidized chain extender is epoxidized cardanol glycidyl ether or epoxidized-cardanol oleate; and the PBAT-PLA blend film modified by the epoxidized cardanol-based chain extender is applied in agricultural mulching films and packaging films.

2. The PBAT-PLA blend film modified by the epoxidized cardanol-based chain extender according to claim 1, wherein the raw materials comprise, in parts by weight, 85 parts of the PBAT, 15 parts of the PLA, and 1 part of the epoxidized chain extender.

3. The PBAT-PLA blend film modified by the epoxidized cardanol-based chain extender according to claim 1, wherein the epoxidized cardanol glycidyl ether is prepared by oxidation of cardanol glycidyl ether in $H_2O_2$ solution at 65 degrees Celsius for 3 hours.

4. The PBAT-PLA blend film modified by the epoxidized cardanol-based chain extender according to claim 1, wherein the epoxidized-cardanol oleate is a cardanol oleate obtained by esterification of cardanol with oleic acid and following oxidation with $H_2O_2$ solution at 65 degrees Celsius for 3 hours.

5. A preparation method of the PBAT-PLA blend film modified by epoxidized cardanol-based chain extender according to claim 1, comprising steps as follows:

weighing each raw material according to the parts by weight, mixing the PBAT, the PLA and the epoxidized chain extender, and performing melting, extruding and granulating to obtain a blends masterbatch, and then extrusion blowing the blends masterbatch into a film to obtain the PBAT-PLA blend film modified by the epoxidized cardanol-based chain extender.

6. The preparation method of the PBAT-PLA blend film modified by epoxidized cardanol-based chain extender according to claim 5, wherein the melting, extruding and granulating are carried out under a temperature of 160-170 degrees Celsius.

7. The preparation method of the PBAT-PLA blend film modified by epoxidized cardanol-based chain extender according to claim 5, wherein a temperature of extrusion blowing into the film is 160-165 degrees Celsius and a take-up speed of 3 meters per minute.

* * * * *